United States Patent [19]
Petit

[11] Patent Number: 5,491,727
[45] Date of Patent: Feb. 13, 1996

[54] APPARATUS USEFUL IN RADIO COMMUNICATION OF DIGITAL DATA USING MINIMAL BANDWIDTH

[75] Inventor: Raymond C. Petit, Oak Harbor, Wash.

[73] Assignee: Hal Communications Corp., Urbana, Ill.

[21] Appl. No.: 113,861

[22] Filed: Aug. 30, 1993

Related U.S. Application Data

[62] Division of Ser. No. 726,842, Jul. 8, 1991, Pat. No. 5,253,270.

[51] Int. Cl.$^6$ .................................................. H04L 7/00
[52] U.S. Cl. ........................................ 375/358; 375/270
[58] Field of Search ................................. 375/45, 58, 50, 375/60, 109

[56] References Cited

U.S. PATENT DOCUMENTS

| | | | |
|---|---|---|---|
| 3,534,264 | 10/1970 | Blasbalg et al. | 375/58 |
| 3,536,840 | 10/1970 | Sullivan | 375/58 |
| 3,593,142 | 7/1971 | Freeny | 375/109 |
| 3,646,518 | 2/1972 | Weinstein | 371/35 |
| 4,736,388 | 4/1988 | Eguchi | 375/58 |
| 4,756,007 | 7/1988 | Qureshi et al. | 375/58 |
| 4,797,898 | 1/1989 | Martinez | 375/109 |
| 5,008,903 | 4/1991 | Betts et al. | 375/60 |
| 5,051,899 | 9/1991 | Ikoma et al. | 371/34 |
| 5,128,965 | 7/1992 | Henriksson | 375/58 |
| 5,265,151 | 11/1993 | Goldstein | 375/58 |

*Primary Examiner*—Stephen Chin
*Assistant Examiner*—T. Ghebretinsae
*Attorney, Agent, or Firm*—Woodard, Emhardt, Naughton, Moriarty & McNett

[57] ABSTRACT

Apparatus useful for communicating digital data using a steady stream of pulses which achieve very high ratios of bit rate per occupied bandwidth using digital signal synthesis techniques to produce a stream of constant phase tone pulses having exceptional spectral compactness. An optimal pulse is formed having either no sidelobe energy in the frequency spectrum and few to no sidelobes in the time domain, or no sidelobes in the time domain and minimal sidelobe energy in the frequency spectrum. Each optimal pulse has a specially shaped, non-constant amplitude envelope. The embodiment having no sidelobes in the time domain uses both a pulse envelope corresponding to a Dolph-Chebyshev function and more than one frequency of tones with offset timing of overlapping tone pulses so that their envelopes go to zero at different times. The invention is particularly well suited for single sideband radio communication at frequencies below 30 MHz.

7 Claims, 13 Drawing Sheets

Microfiche Appendix Included
(258 Microfiche, 3 Pages)

\* Adapted for Constant Phase, Non-constant Amplitude Tone Pulses Having any of
(1) No Frequency Spectrum Sidelobes,
(2) A Dolph-Chebyshev Function Envelope or
(3) More Than One Frequency of Tones with Offset Timing of Overlapping Pulses

APPARATUS USEFUL IN RADIO COMMUNICATION OF DIGITAL DATA USING MINIMAL BANDWIDTH

This application is a division of application Ser. No. 07/726,842, filed Jul. 8, 1991, U.S. Pat. No. 5,253,270.

This application additionally includes a microfiche appendix comprising 3 sheets of microfiche having a total number of 258 frames.

BACKGROUND OF THE INVENTION

1. Field of the Invention

This invention relates to the field of radio communication, and specifically to methods for efficient transfer of data over radio paths at frequencies below 30 MHz where available bandwidth is scarce and inconsistent propagation characteristics often seriously distort the signal. Additionally this invention relates in general to modulation and demodulation devices, more-specifically, the present invention relates to a digital processing format for modulation and demodulation using an optimally shaped wave form for digital transmission of a high density band limited series of pulses.

2. Description of the Prior Art

Modems already in wide use on h.f. radio have taken one of two extremely divergent approaches in regard to the amplitude envelope the signal transmitter is required to generate. The single-tone modems produce a constant-envelope carrier and either frequency modulate it or phase modulate it with continuous functions, some of which have continuous derivatives as well. The advantage of this, of course, is that the transmitter can use a nonlinear power amplifier, and the amplifier can operate at its full power rating all the time. High frequency radio paths distort the signals in such a way that transmission of more than about 100 data bits per second on a single carrier frequently may become impossible. The standard solution is to generate many such modulated tone carriers simultaneously at closely-spaced audio frequencies and modulate them with slower-speed data streams.

Multitone modems require transmitters with linear power amplifiers because the envelope of the composite signal varies from zero to a peak which is equal to the number of tones used times the peak amplitude of each tone. As a result, the available amplifier power is used very inefficiently. The amplifier must be capable of handling the relatively infrequent enormous peaks of power, but it spends almost all of its time generating signals at a tiny fraction of its capacity. Some designs have used amplitude limiter circuits in the rf signal chain followed by bandpass filters to eliminate the out-of-band radiation produced by the clipping in a manner like speech rf "compressor" circuits. This gets the average power of the amplifier closer to its peak rating, but it also introduces data errors which the receiving processor is required to correct.

SUMMARY OF THE INVENTION

The invention relates to apparatus useful with radio communication of digital data using a series of pulsed signals which are specially adapted for operation over marginal signal paths at high ratios of bit rate per occupied bandwidth. This apparatus incorporates software for encoding data so that each pulsed signal of the series has a constant phase selected in response to digital data values. The envelope of each pulse in the series is smooth-shaped and non-constant amplitude and which has one or more of:

(1) no sidelobe energy in the frequency spectrum, (2) a pulse envelope corresponding to a Dolph-Chebyshev function, or (3) more than one frequency of tones with offset timing of overlapping tone pulses so that their envelopes go to zero at different times.

It is another aspect of the present invention that data is carried in the difference in phase between successive pulses. Furthermore, phase changes are only made at the instant halfway between the peaks of two adjacent pulses when their amplitude envelopes are zero.

It is another feature of this invention to provide a method for maintaining frequency synchronization of the receiver in response to the received pulses.

It is a further object of this invention to estimate the transmission path characteristics and adjust transmitter power levels, modulation, and coding format accordingly.

Further objects and advantages of the present invention will become apparent from the description of the preferred embodiments which follows.

BRIEF DESCRIPTION OF THE DRAWINGS

FIG. 7b is a flow chart which corresponds to the representation of FIG. 7a.

FIGS. 13a–e illustrate the overlapping of a series of tone pulses (13a–d) in time, with tile summation (13e) corresponding to the output of summation node 135 of FIG. 7a.

DESCRIPTION OF THE PREFERRED EMBODIMENTS

Figure 1:
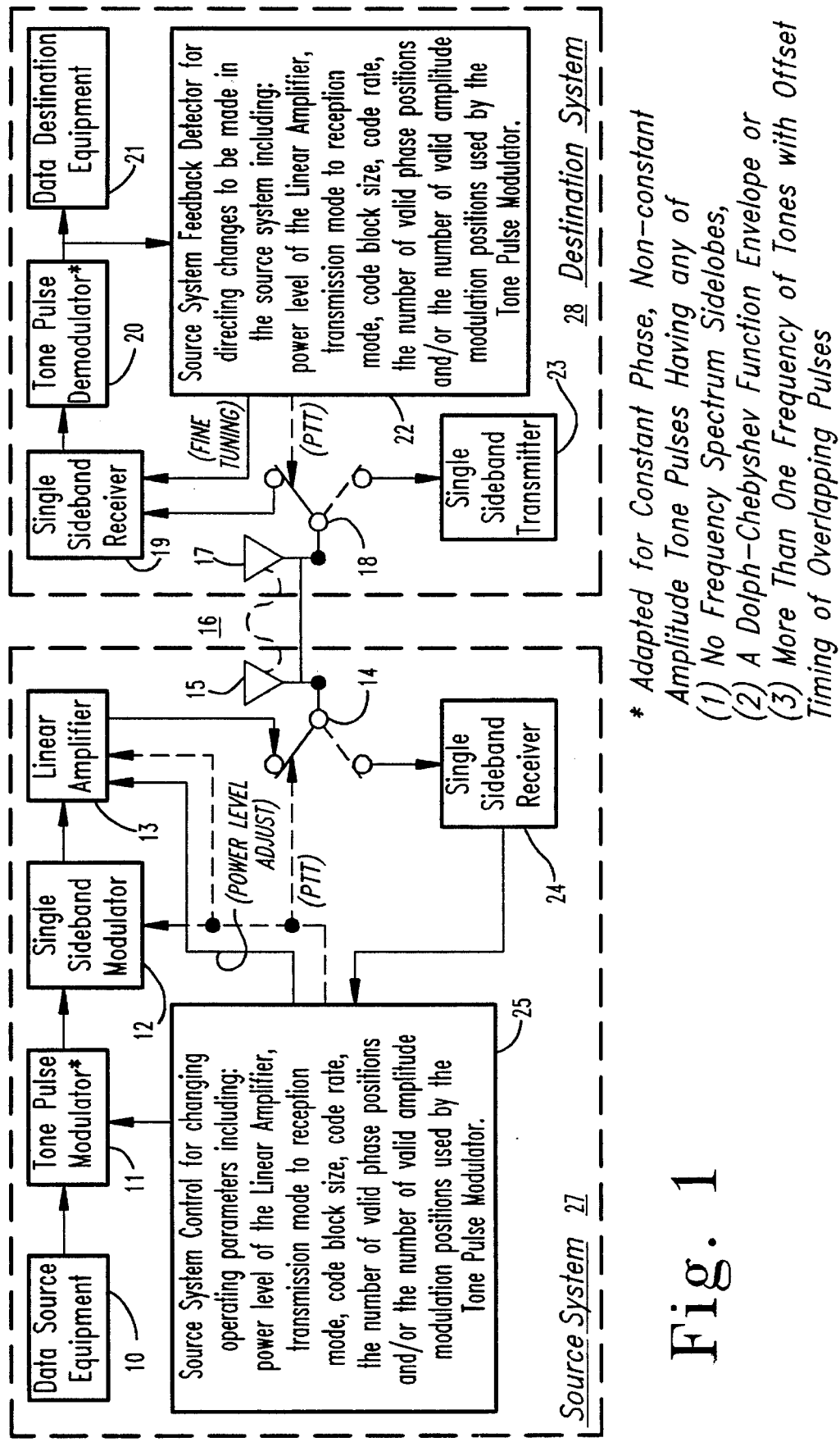
FIG. 1 is a block diagram of a system incorporating the preferred embodiments of applicant's invention for communicating digital data via an HF single sideband radio system.

For the purposes of promoting an understanding of the principles of the invention, reference will now be made to two embodiments illustrated in the drawings and specific language will be used to describe the same. The first embodiment consists of a modulator that generates at each of four center frequencies, a series of specially-shaped, non-overlapping tone pulses. The second embodiment of the invention consists of a modulator that generates a series of specially-shaped, overlapping tone pulses at one frequency. It will nevertheless be understood that no limitation of the scope of the invention is intended by limiting this detailed disclosure to these two embodiments. Applicant contemplates such alterations and further modifications in the illustrated devices, and such further applications of the principles of the invention as illustrated therein as would normally occur to one skilled in the art to which the invention relates.

Referring particularly to FIG. 1, there is illustrated apparatus for transmission and reception of digital data using a series of pulsed signals which are specially adapted for operation over marginal signal paths at high ratios of bit rate per occupied bandwidth. Digital data from data source equipment 10 connects to a tone pulse modulator 11 which is adapted for producing a series of tone pulses, each of which has a constant phase, but non-constant amplitude, specially shaped so that the pulses have and which has one or more of (1) no sidelobe energy in the frequency spectrum, (2) a pulse envelope corresponding to a Dolph-Chebyshev function, or (3) more than one frequency of tones with offset timing of overlapping tone pulses so that their envelopes go to zero at different times. The digital information is carried by the pulses in various combinations of specific phase (0–16 phase levels depending upon quality of transmission path) of the pulse tone in comparison to the prior pulse phase, and amplitude of the pulse tone, varied in 4 dB increments (0–4 amplitude levels depending upon quality of transmission path).

A single sideband suppressed carrier high frequency (below 30 MHz) modulator 12 produces a single sideband signal from the series of pulses received from the tone pulse modulator 11. This single sideband signal is then amplified by linear amplifier 13 and connects via antenna switch 14 to the antenna 15.

The preceding description has been associated with the source system 27 from which the digital data originated. To the right of antenna 15 is the destination system 28.

The signal from antenna 15 passes through a marginal signal path 16, as is often observed on distant communication in the amateur radio 40 or 80 meter bands. Such signal paths have multipath interference problems as well as other well known problems resulting from ionospheric disturbances. When the single sideband signal is received by the destination system 28 through antenna 17 and antenna switch 18, the single sideband receiver 19 demodulates it to produce the series of tone pulses at its audio output.

These pulses then are demodulated by tone pulse demodulator 20 to recover the data originally provided by data source equipment 10. This data connected to suitable data destination equipment 21 to complete the communication of the data. Tone pulse demodulator 20 is optimized for reception of the same type of special tone pulses which are generated by tone pulse modulator 11. Although not shown in this figure, the data in tone pulse modulator 11 is initially modified by Reed-Solomon encoding to facilitate error correction, and correspondingly decoded in tone pulse modulator 20 to recover the data with error correction.

Source system feedback detector 22 detects and corrects receiver frequency offset by sampling the phase of a received pulse before and after the optimal time of sampling and provides a fine tuning signal to receiver 19 so that its frequency can be adjusted in response to the sampled phase differences. Additionally, feedback detector 22 assesses the quality of received data to initiate appropriate responses in the source system 27.

Single sideband transmitter 23 receives responses from the detector 22 and transmits a single sideband control signal in order through antenna switch 18, antenna 17, signal path 16, antenna 15, antenna switch 14, and to single sideband receiver 24. Receiver 24 recovers the signal which the feedback detector 22 produced. This recovered signal is used by the source system control 25 to change operating parameters of the modulator and linear amplifier in response to receipt by the destination system 28 of a changed quality signal.

Examples of characteristics which may be changed by source system control 25 are:

1. Power level of linear amplifier 13: The source system feedback detector 22 includes circuitry which correlates the signal-to-noise ratio of the received signal to the accumulated phase errors within tone pulses. The results of this correlation are relayed back through transmitter 23 and receiver 24 to control 25 to adjust the remote source system linear amplifier 13 power when appropriate.

2. Transmission mode to reception mode, and vice versa. This is to enable control 25 to receive source system feedback detected by detector 22, and to change back again after such information has been received.

3. Change code block size and code rate (percentage of original data in error correction encoded data) for Reed Solomon encoded data.

4. Change number of valid phase positions and/or number of valid amplitude modulation positions used by the tone pulse modulator 11.

It will be appreciated by those skilled in the art that the characteristics which may be changed by the source system control 25 may be conveniently grouped into two categories. First, the data encoding format of the transmitted data may be changed, such as by altering the code block size, the number of valid phase positions and/or the number of valid amplitude modulation positions, for example. These are changes in the way the data is encoded, in preparation for transmission. Secondly, the transmission characteristics may be changed, such as by altering the transmission power level or the rate at which the data is transmitted. These are changes in the way the data is transmitted after it has been encoded.

Figure 2:
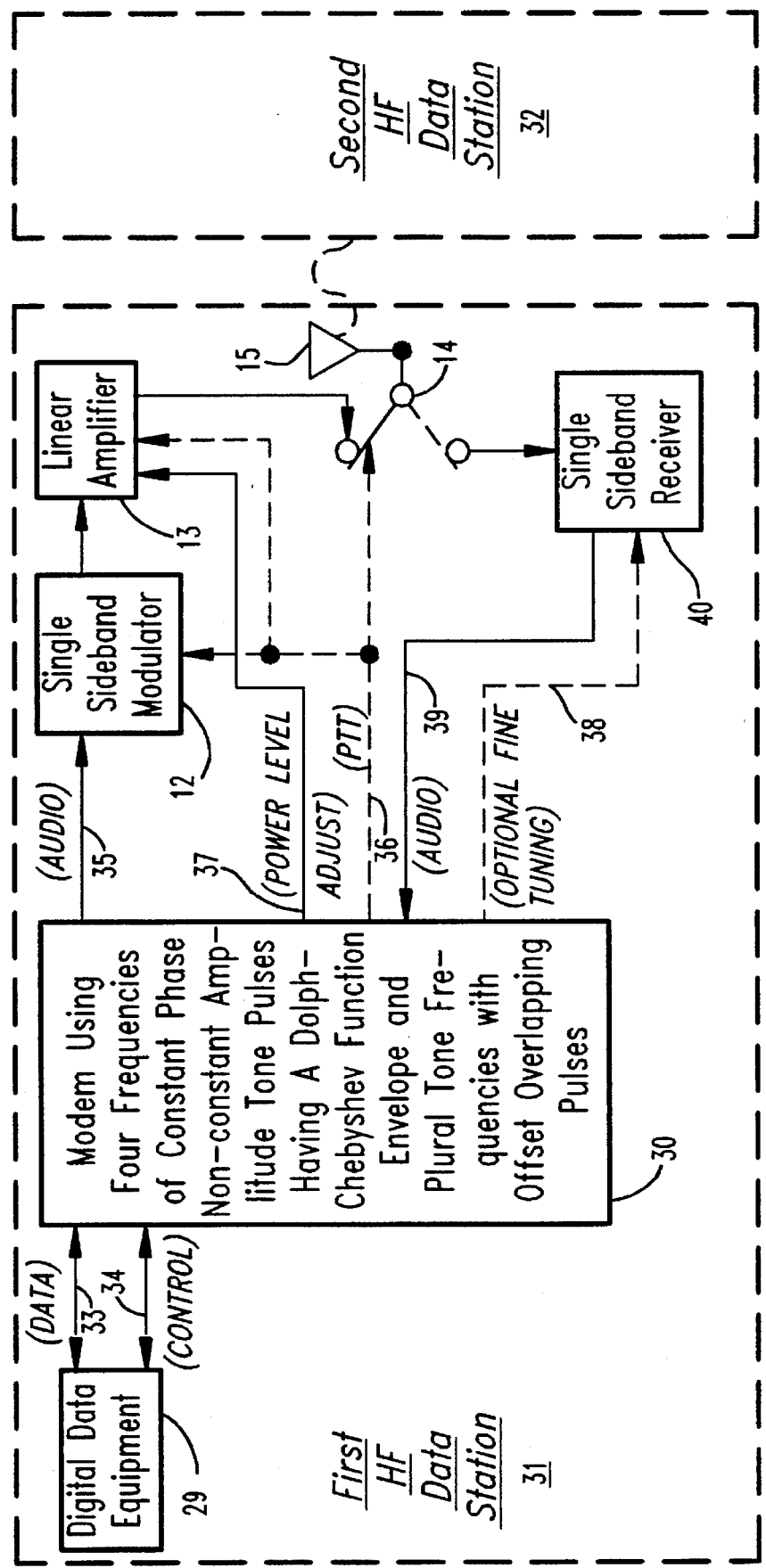
FIG. 2 is a block diagram of a 4-tone version of the invention of FIG. 1.

Referring now to FIG. 2, there is disclosed a specific 4-tone version of the invention of FIG. 1. This version includes a first HF data station 31 which functions either as a source system 27 or as a destination system 28. This first HF data station operates with an identical second HF Data Station 32 so that when paired either may be the source and the other the destination for the digital data.

The first HF data station 31 includes digital data equipment 29 which bidirectionally couples data to modem 30 on data line 33, in accord with control signals on its bidirectional control line 34. When station 31 is functioning as a source system 27, digital data equipment 29 functions as data source 10, and when station 31 is functioning as a destination system 28, digital data equipment 29 functions as data destination equipment 21.

Modem 30 uses four frequencies of constant phase, non-constant amplitude tone pulses having no time domain sidelobes and which has both a pulse envelope corresponding to a Dolph-Chebyshev function and more than one frequency of tones with offset timing of overlapping tone pulses so that their envelopes go to zero at different times.

When references are made herein to frequencies of pulses, it is to be understood to refer to the center frequencies of the pulses.

Source system control functions are conveyed by the temporary omission of selected pairs of these four frequencies. Modem 30 has an audio output line 35 which conveys not only information corresponding to the output of Tone Pulse Modulator 11 of FIG. 1 when functioning as a source system 27, but also information corresponding to the output of Feedback Detector 22 of FIG. 1 when functioning as a destination system 28. Output line 35 connects to the series of single sideband HF modulator 12, linear amplifier 13, antenna switch 14 and antenna 15 as described above in connection with FIG. 1. Modem 30 also has a PTT line 36 to alternate items in this series between transmit and receive modes. A power level adjust line 37 connects to the linear amplifier to adjust its power in response to transmission conditions.

Single sideband receiver 40 functions as receiver 24 with its audio output going (via line 39) to the system control functions in modem 30 when station 31 is the source system. Receiver 40 functions as receiver 19 with audio output going (via line 39) to the demodulator functions in modem 30 and its frequency being fine tuned (via fine tuning line 38) by the control functions of modem 30 when station 31 is the destination system.

Figure 3:
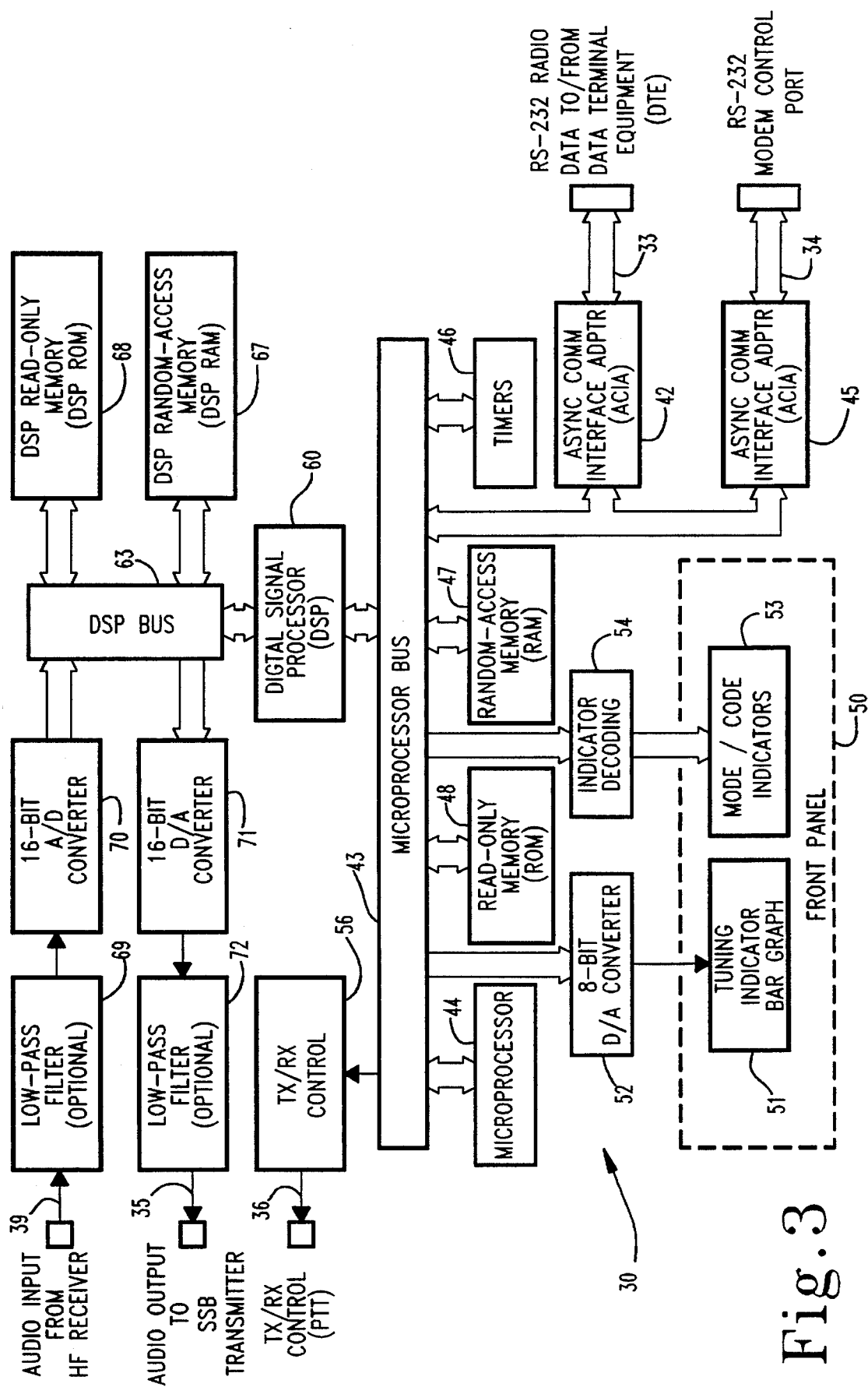
FIG. 3 is a block diagram of the modem 30 shown in FIG. 2.

Referring now to FIG. 3, the modem 30 of FIG. 2 is illustrated. The modem 30 connects to data via data line 33 shown bidirectionally connected via an RS-232 connection with digital data equipment 29 of FIG. 2. This data connects to an asynchronous communication interface adapter (ACIA) 42 which in turn connects to a microprocessor bus 43. The microprocessor bus is controlled by and connects to microprocessor 44, a Motorola 68B09 8-bit processor, which is programmed in accordance with source code as set forth in an Appendix to this application, which appendix is hereby incorporated by reference.

Modem 30 is connected via a control line 34 shown bidirectionally connected via an RS-232 connection with digital data equipment 29 of FIG. 2. Data control signals on line 34 connects to an asynchronous communication interface adapter (ACIA) 45 which in turn connects to a microprocessor bus 43. Additional components typically associated with the operation of a microprocessor, including timers 46, random access memory (RAM) 47, read-only memory (ROM) 48, are connected to bus 43.

The modem has a front panel 50 which includes displays of a tuning indicator bar graph 51 driven by an 8-bit digital to analog (D/A) converter 52 coupled to bus 43 and mode code indicators 53 driven by an indicator decoding circuit 54 also coupled to bus 43.

As part of the control functions of modem 30 a tuning control circuit could be connected to bus 43 for providing a fine tuning signal on line 38 to control receiver tuning, however as will be seen hereafter, software programs can handle ordinary tuning errors in the 4-tone version without the need for such circuitry. Additionally a TX/RX control circuit is connected to bus 43 to provide a PTT signal on line 36 to control whether the system is in transmit or receive mode.

A digital signal processor (DSP) 60 connects both to the microprocessor bus 43 and to its own DSP bus 63. Additional components are associated with the operation of digital signal processor 60, including a DSP random access memory (DSP RAM) 67, DSP read-only memory (DSP ROM) 68, which are connected to DSP bus 63. These digital signal processor components when in the source mode provide a means to create a phase difference between two successive pulses in response to digital data. As programmed, they contain tables of values corresponding to the desired tone pulse envelopes. These envelopes are correlated to a Dolph-Chebyshev function, which eliminates the presence of sidelobes in the time domain, and have minimal sidelobes in the frequency domain. Details concerning this function are found in The Fast Fourier Transform and its Applications by E. Oran Brigham, published Prentice Hall, Signal Processing Series, Englewood Cliffs, N.J., Copyright 1988, pp. 183-187. In destination mode, the receive filtering is optimized to match the transmitted signal characteristics.

In the destination mode, audio input from the HF receiver enters modem 30 through line 39 and an optional low pass filter 69 before being converted digital values by a 16-bit analog to digital (A/D) converter 70 which values are accessed via the DSP bus 63. The reverse situation occurs in the source mode, when digital values are obtained via the DSP bus 63 and converted to analog values by a 16-bit D/A converter 71, whose output is filtered by an optional low pass filter 72 to be made available via line 35 as audio output to the single sideband transmitter modulator 12.

Figure 4:
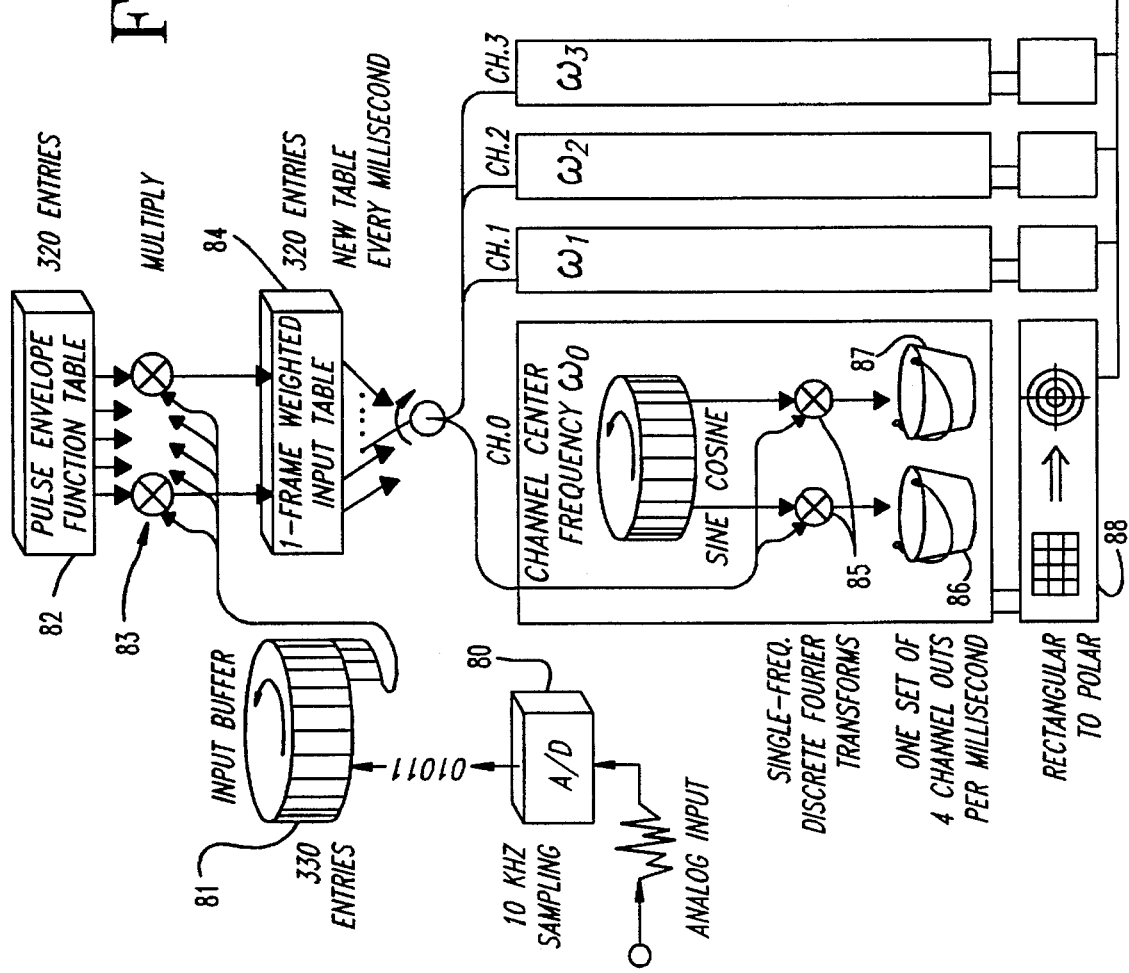
FIG. 4 is an electromechanical representation of the functioning of the demodulating portion of the modem of FIG. 3.

The operation of modem 30 is best understood by reference FIG. 4, the following pseudocode, and the actual source code in Appendix A to this application, with sections thereof referenced herein as A1, A2, etc. As seen in FIG. 3, the controller functions of modem 30 are partitioned into two sections: the digital signal processor (DSP) 60 and the microprocessor (host) 44. The DSP 60 handles the low and intermediate level filtering, signal-recognition and signal-generation tasks. The host 44 serves as the modulation-type formatter, Reed-Solomon coder, protocol manager and command processor. At the interface between them is a simple data structure specifying the amplitude, phase, and frequency of each of the four pulses in a frame. When transmitting, the host 44 deposits the desired values in this structure and the DSP 60 generates the signal; when receiving, the DSP 60 reports these values to the host 44 from its observation of the channel.

The DSP transmit/receive processor source code (A1) uses a table of values for the Dolph-Chebyshev envelope function, a table of sine values, and an array of pointers to these tables and to the input frequency-amplitude-phase (FAP) data all stored in memory. Every 8 milliseconds new FAP data from the host is used to set initial values for the pointer registers to each table for each of the pulses in the 4 frequency channel system.

An amplitude scaling value is multiplied by a sine table referenced by the pointer register. This result is then multiplied by an envelope function value. This result is added to a sum already obtained for this same process for each of the four pulses. An interrupt driven process continuously synthesizes the pulses-so defined and passes the values to a D/A converter at a sampling rate of 10 kHz. Pseudocode for the system modulator algorithm is set forth in Table 1.

TABLE 1

THE 4-TONE VERSION
SYSTEM MODULATOR ALGORITHM
IN STRUCTURED PSEUDOCODE
[with comments in Brackets]

Initialization:
Define          pulse envelop lookup table. [Its length is the
pulse duration in seconds times the chosen sample
rate, in this implementation $0.032 \times 10,000$
320. Its entries are the values of a 60-dB
Dolph Chebyshev function. signed fraction format,
normalized to 1]
Define          four registers R4 . . . R7 as circular buffer pointers
to locations in the pulse envelope lookup table.
Set R4 to point to the base of the table.
Set R5 to point to the start of the fourth quarter of the
         table.
Set R6 to point to the start of the third quarter of the
         table.
Set R7 to point to the start of the second quarter.
Define          a sine lookup table in circular buffer format.
[length of table is such that reading a new value
each sample time produces 62.5 Hz sinewave: 160
signed fractions]
Define          four circular buffer pointers, R0..R3 and set
their initial values to the base of the sine table
Define          four registers, N0 . . . N3, the contents of which can
be added to the respective circular buffer
pointers modulo the sine table length, and set
their initial values to 0.
Define          twelve memory locations to store the PHASE,
AMPLITUDE, and FREQUENCY command values for each
of the 4 pulses: PHASE0, PHASE1, PHASE2, PHASE3;
FREQ0, FREQ1, FREQ2, FREQ3;
AMP0, AMP1, AMP2, AMP3.
Initialization end.
Transmit-
processor:
Repeat until commanded to stop:
    Setup-pulse 0     [Defined below]
    Generate-signal     [Defined below]
    Setup-pulse 1
    Generate-signal
    Setup-pulse 2
    Generate-signal
    Setup-pulse 3
    Generate-signal
Transmit-processor End.
Setup-pulse # [# denotes the pulse id, from 0 to 3]
Obtain the desired pulse AMPLITUDE, FREQUENCY, and PHASE
    from the host processor.
Copy the AMPLITUDE to memory AMP#. [AMPLITUDE is an
    unsigned fraction, normalized to 1.]
Copy the PHASE to memory PHASE#. [PHASE has values from 0
    to 159, corresponding to each of the 160 data points
    in the sine lookup table.]
Copy the FREQUENCY to memory FREQ#. [FREQUENCY is an
    integer from 1 to at most about 40. FREQUENCY * 62.5
    Hz will be the pulse center frequency in Hertz.]
Set R# to the base address of the sine table.
Copy PHASE# to N#.
Add N# to R#. [This points R# to the sine table location
    corresponding to the desired carrier phase.]
Copy FREQ# to N#. [N# will be added to R# before each sine
    table lookup.]
Setup-pulse End.
Generate-signal:     [Using two accumulators, A and B, and with
        the symbol ":" denoting assignment]
Repeat 80 times: [80 is 1/4 the envelope lookup table
        length]
  A := 0
°B := AMP0 * (sine table at R0)
  R0 := R0 + N0 in circular buffer addressing
  A := A + B * (envelope table at R4)
  Increment R4 in circular buffer addressing
  B := AMP1 * (sine table at R1)
  R1 := R1 + N1 in circular buffer addressing
  A := A + B * (envelope table at R5)
  Increment R5 in circular buffer addressing

TABLE 1-continued

THE 4-TONE VERSION
SYSTEM MODULATOR ALGORITHM
IN STRUCTURED PSEUDOCODE
[with comments in Brackets]

```
B := AMP2 * (sine table at R2)
R2 := R2 + N2 in circular buffer addressing
A := A + B * (envelope table at R6)
Increment R6 in circular buffer addressing
B := AMP3 * (sine table at R3)
R3 := R3 + N3 in circular buffer addressing
A := A + B * (envelope table at R7)
Increment R7 in circular buffer addressing
A := A/2
Wait until sample-time interrupt occurs
Transfer contents of A to D/A converter
Generate-signal End.
```

Referring now more particularly to FIG. 4, there is schematically illustrated the process used with the signal processing system of the 4-tone version. The DSP receive code uses the same envelope function-value tables and sine value tables as the transmitter. Input data bits are taken at the 10 kHz sampling rate by A/D converter 80 and stored in a circular buffer 81. Every millisecond, the last 32 milliseconds of data in the buffer is array-multiplied by multipliers 83 times the Dolph-Chebyshev table 82 of envelope values to produce a "weighted" input record at 84.

Then, for each of the four channels, this record is multiplied by a sine-cosine pair 85 at the channel center frequency [implementing a quadrature down-mixer in software] and the in-phase and quadrature components are accumulated in separate registers 86 and 87 respectively to yield a real-imaginary pair representing the channel's total received energy. The weighting process in concert with the downmix/accumulate, implements a channel filter having selectivity exactly matching the transmitted pulse. A rectangular to polar converter 88 routine then transforms this data into magnitude and angle information.

Accompanying the channel filtering operation is an envelope profiler 89. It uses an array of 32 first-order low pass filters 90 implemented in software to distinguish the four tone pulse system carrier from noise and other signals and to alert the host processor via an interrupt when a carrier appears. A frame synchronizing routine locates the maximum of each received pulse and extracts the magnitude and phase of that maximum plus additional phase information used by the host's frequency-offset compensator. Pseudocode for the signal processing system is set forth in Table 2.

TABLE 2

THE 4-TONE VERSION
RECEIVE SIGNAL PROCESSING SYSTEM
IN STRUCTURED PSEUDOCODE
[with comments in Brackets]

```
Initialization:
    Create "PULSE", a 320-entry table of the pulse envelope
        function, with each entry a signed fraction. [at
        present a normalized 60-dB Dolph Chebyshev function]
    Create "SINE", a 160-entry sine table a circular buffer of
        signed fractions.
    Allocate 330 memory locations for circular buffer INBUFFER.
    Allocate 320 locations of memory for "WEIGHTED". [for the
        table of weighted input values for one frame].
    Allocate 32 memory locations for the circular buffer
        PROFILER
    Allocate four arrays of 32 locations each for the channel
        circular buffer phase records, PHAS0 . . . PHAS3.
    Set up an interrupt system to digitize input data at a
        10-kHz sample rate and deliver data values to
        successive locations in INBUFFER.
Initialization End.
Processor:
    At every tenth interrupt:
        Indexing through the last-received 320 locations in
            INBUFFER, the 320 locations of WEIGHTED, multiply
            the INBUFFER entry by the PULSE entry to produce
            the entry in WEIGHTED.
        Compute four points of the discrete Fourier transform
            of WEIGHTED at the four pulse center frequencies,
            and perform rectangular-to-polar conversion on
            each of the four outputs.
        Store each channel phase output in its respective
            array PHAS0 . . . PHAS3 at the offset location
            determined by the FRAME_INDEX.
```

TABLE 2-continued

THE 4-TONE VERSION
RECEIVE SIGNAL PROCESSING SYSTEM
IN STRUCTURED PSEUDOCODE
[with comments in Brackets]

```
    Add a small fraction DELTA of the magnitude output of
        each channel to one of the PROFILER cells, and
        then multiply that cell's contents by (1-DELTA).
        The profiler cell accessed is given by (Profiler
        base_location + FRAME_INDEX - Channel_number * 8)
        modulo 32. [This causes the peaks of all four
        pulses to coincide in the profiler filters.]
    Find the minimum of the profiler. If the location of
        the minimum is that of FRAME_INDEX:
        Subtract the data at PROFILER offset (FRAME_INDEX +
            16) from the data at PROFILER offset
            FRAME_INDEX. If the difference is greater
            than the CARRIER_DETECT_THRESHOLD, announce
            or sustain "carrier detect" status.
        Locate the points in the arrays PHAS0 ... PHAS3 with
            indices corresponding to the locations of
            the amplitude maximums. Report these phases
            and the amplitude maximums to the host
            processor.
        Locate the points in the arrays PHAS0 ... PHAS3 with
            indices corresponding to plus and minus 4
            from the amplitude maximums of the
            respective pulses. Compute the differences
            between the phase at +4 relative to maximum
            and -4 relative to maximum for each pulse,
            and add the four differences. Report the
            result to the host as the COMPENSATOR.
            [This is used for adjustment to compensate
            for frequency offset of the receiver tuning.]
    Increment the FRAME_INDEX modulo 32.
Processor End.
```

The above software provides means for detecting receipt of compatible signals by digitally filtering at the tone pulse repetition frequency and producing a synchronizing signal when a threshold level is detected. In the case of the 4-tone version in particular, there is separation of the four different frequencies of tone pulses, offsetting each in time with channel magnitudes positioner 91, summing the four offset values with the profiler 90, and digitally filtering the result. A comparison of magnitudes of filter outputs at 16-cell offsets, biased by a threshold provides a carrier detect mechanism as shown at 92.

The host processor software is a package of six modules: the foreground processor, the "transmit-receive state machine", the Reed-Solomon coder, a library of input/output routines, and a library of utilities.

The foreground processor source code (A2) in the 4-tone pulse embodiment consists mainly of a command interpreter/user interface via which the human operator or computer program using the four tone pulse system communication link sends commands and data and receives status and data. At every point in a command sequence the user receives a prompt line listing all the valid options. The foreground code includes a simple electronic mailbox, a "net" facility permitting every audible 4-tone system consistent with this invention on a frequency to know the identity of every other audible 4-tone system consistent with the preferred embodiment of this invention, a collection of status and channel statistics reports, and some debugging utilities.

The background processor source code (A3) of the 4-tone pulse embodiment is mainly the protocol manager. It steps through the various phases of a signal transmission or reception, sets data and coding formats, invokes the Reed-Solomon coder, routes data to the appropriate foreground processor, and handles protocol error conditions.

The Reed-Solomon source code (A4) with associated data formatters uses fast transform methods to generate codeblocks from which the original data can be reconstructed at the receiver even if up to 15% of the data in the block has been corrupted. The receive decoder also reports the number of errors it was required to correct and a "block fail" flag if it was overwhelmed.

The transmit and receive state machines source code (A5) converts modulation mode commands and bytes of data into frequency-amplitude-phase array settings at the host-DSP interface for transmit and does the reverse for receive.

The utilities source code (A6) include a block memory dump, a memory examine/change command, and a memory test.

The keyboard input routine source code (A7) prompts the user at the keyboard interface of the data source for information on coding and data.

Figure 5:
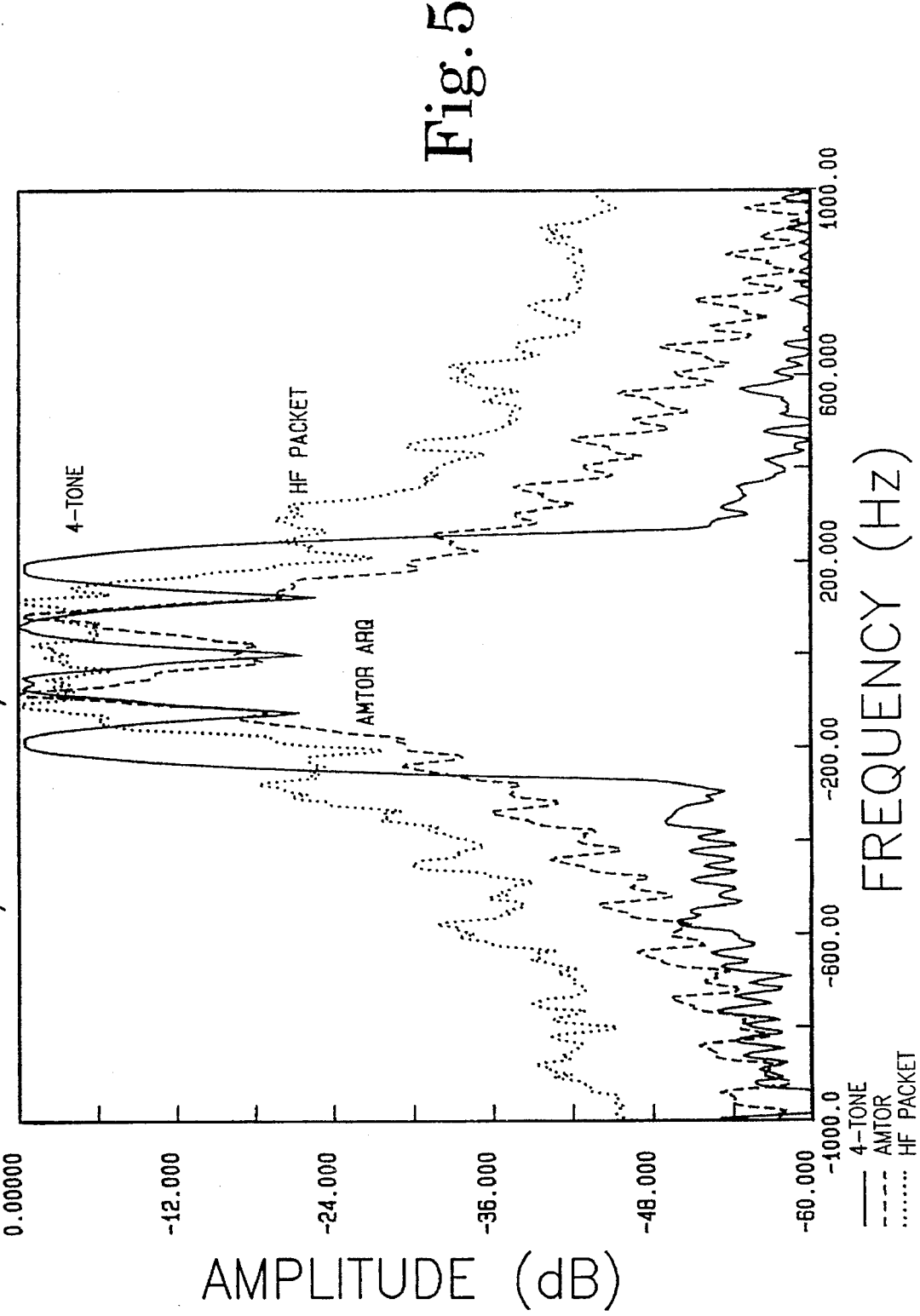
FIG. 5 is a frequency spectrum of the 4-tone version of FIG. 2 compared with two alternative products.

The use in connection with both the transmission and receipt of data envelopes which are correlated to a Dolph-Chebyshev function, together with the accuracies provided by digital processing, results in a striking improvement over alternative systems used with HF radio transmission of data. Referring to FIG. 5 there is illustrated measured data comparing the 4-tone system frequency spectrum waveform 91 with alternative AMTOR waveform 92 and HF PACKET waveform 93. It may be observed that the 4-tone system can be made by merely making modem 30 and connecting it with existing conventional digital data equipment and single sideband (SSB) transceivers. The fact that frequency errors can be readily compensated for with the 4-tone system simplifies the retrofit operation to existing SSB transceivers.

Figure 6:
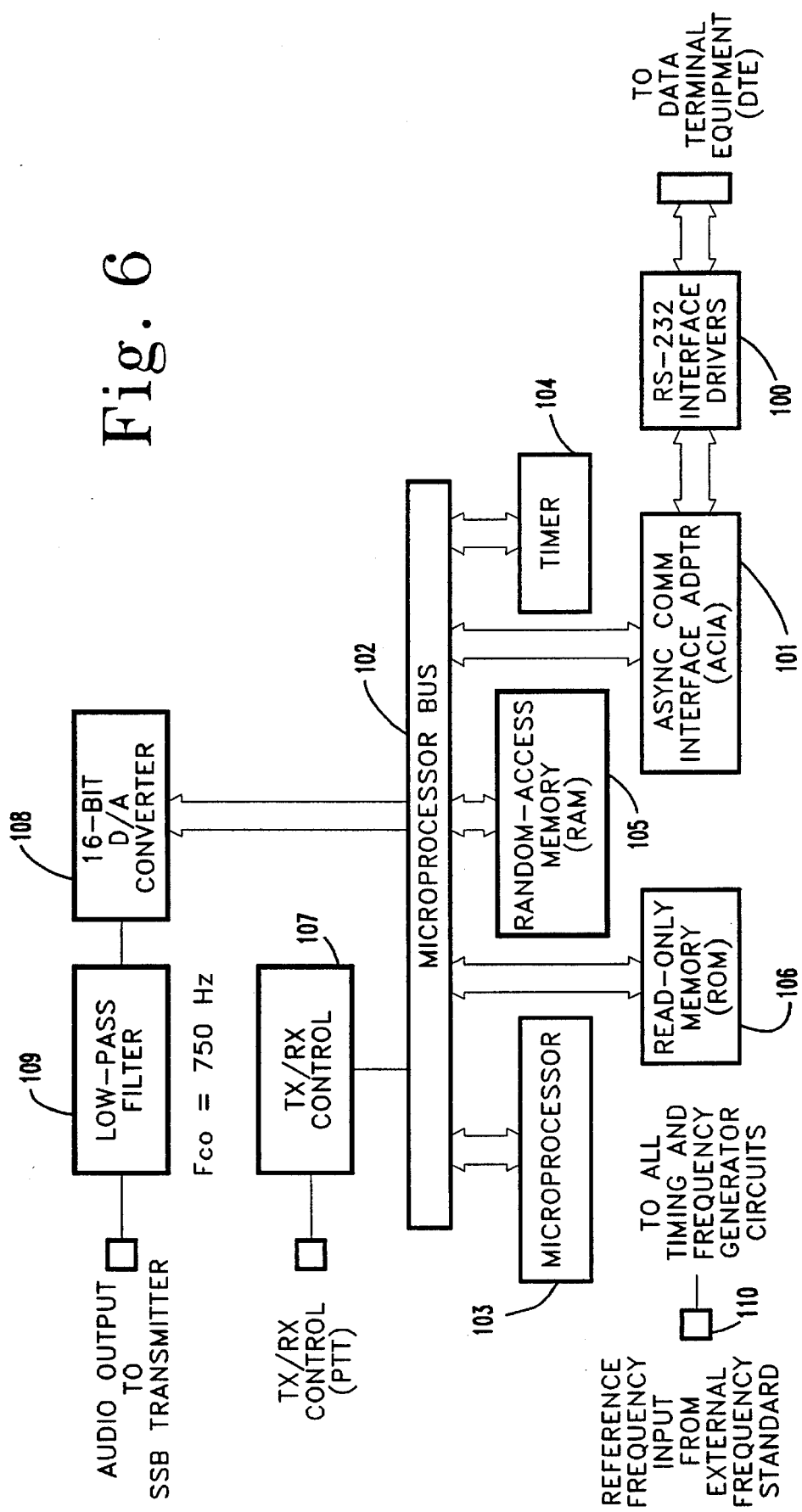
FIG. 6 is a block diagram of the tone modulator of a 1-tone version of the invention of FIG. 1.

The second embodiment of the invention shown in FIG. 1 uses a single frequency tone to generate a series of pulses overlapping in time to produce no frequency spectrum sidelobes and only very minimal sidelobes in the time domain. The circuitry used with the modulator for the 1-tone version is shown in FIG. 6. An RS-232 interface driver 100 is used to couple data terminal equipment such as the data source equipment of FIG. 1 to an asynchronous communication interface adapter (ACIA) 101 which connects to a microprocessor bus 102. Activity on bus 102 is controlled by microprocessor 103, which has associated with it in conventional fashion a timer 104, a random access memory (RAM) 105, and a read-only memory (ROM) 106.

A transmit/receive control signal (TX/RX CONTROL (PTT)) is produced by circuit 107 in response to the commands provided by the microprocessor via the bus 102. As 16-bit D/A converter 108 receives digital signals representing the desired output signal and converts it to analog form, which is then filtered by low pass filter 109 to generate a suitable audio output to the single sideband modulator 12 of the transmitter in FIG. 1. Because of the criticality of timing between the transmitter and the receiver in the 1-tone version, all timing circuits and frequency-generator circuits require an external reference frequency standard at input 110, which may be, for example, WWV signals.

Figure 7A:
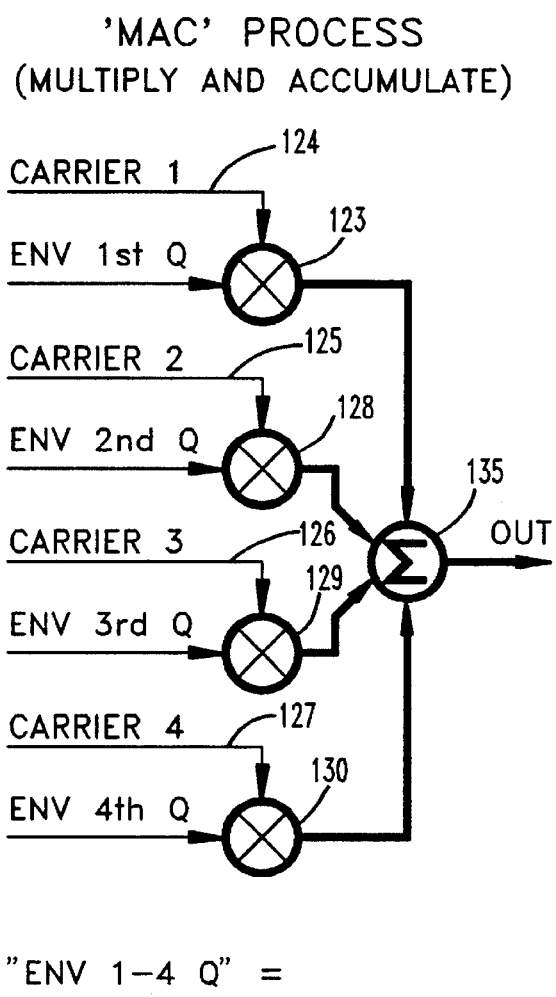
FIG. 7a is a diagramatic representation of of the modulation and summation process used in the modulator of FIG. 6.
Figure 7B:
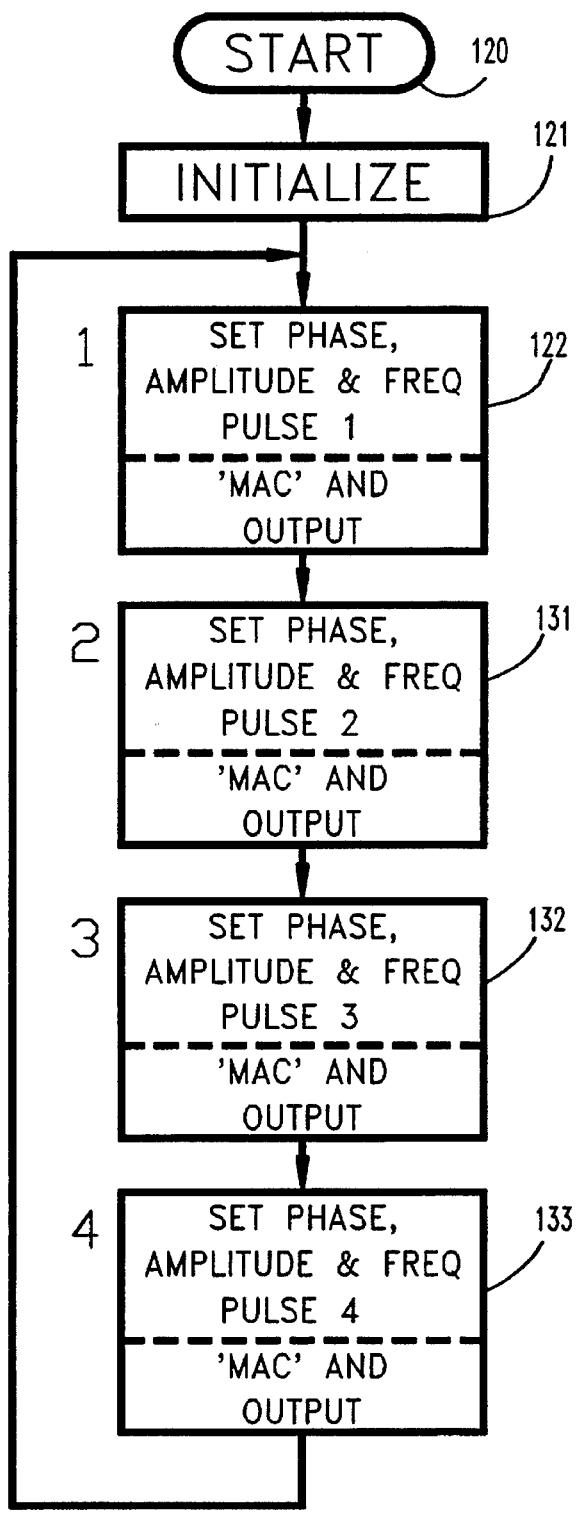

The source code for the Transmit Controller of the 1-tone version of this invention (A9) is broken down into four parts. These four parts together accomplish all of the transmitter control concerning this invention. Schematic representations of the process are shown in FIGS. 7a and 7b. The process starts 120 with an initializing of values 121. A carrier 124 of approximately 500 Hz is generated with an appropriate phase and amplitude 122 for encoding the digital data to next be transmitted. As shown, a quadrature amplitude modulator 123 applies a specially shaped envelope to the data encoded carrier by a multiply and accumulate process. A like process is repeated for 3 additional carriers 125, 126, and 127 differently encoded with other data to be transmitted but having an identical center frequency. With successive delays in time, 3 additional quadrature amplitude modulators 128, 129, and 130 apply identical specially shaped envelopes to the respective data encoded carriers 125, 126, and 127 in steps 131, 132, and 133. The results of each of these processes are summed at summation node 135 and provide the output signal for the single sideband HF modulator.

Figure 8:
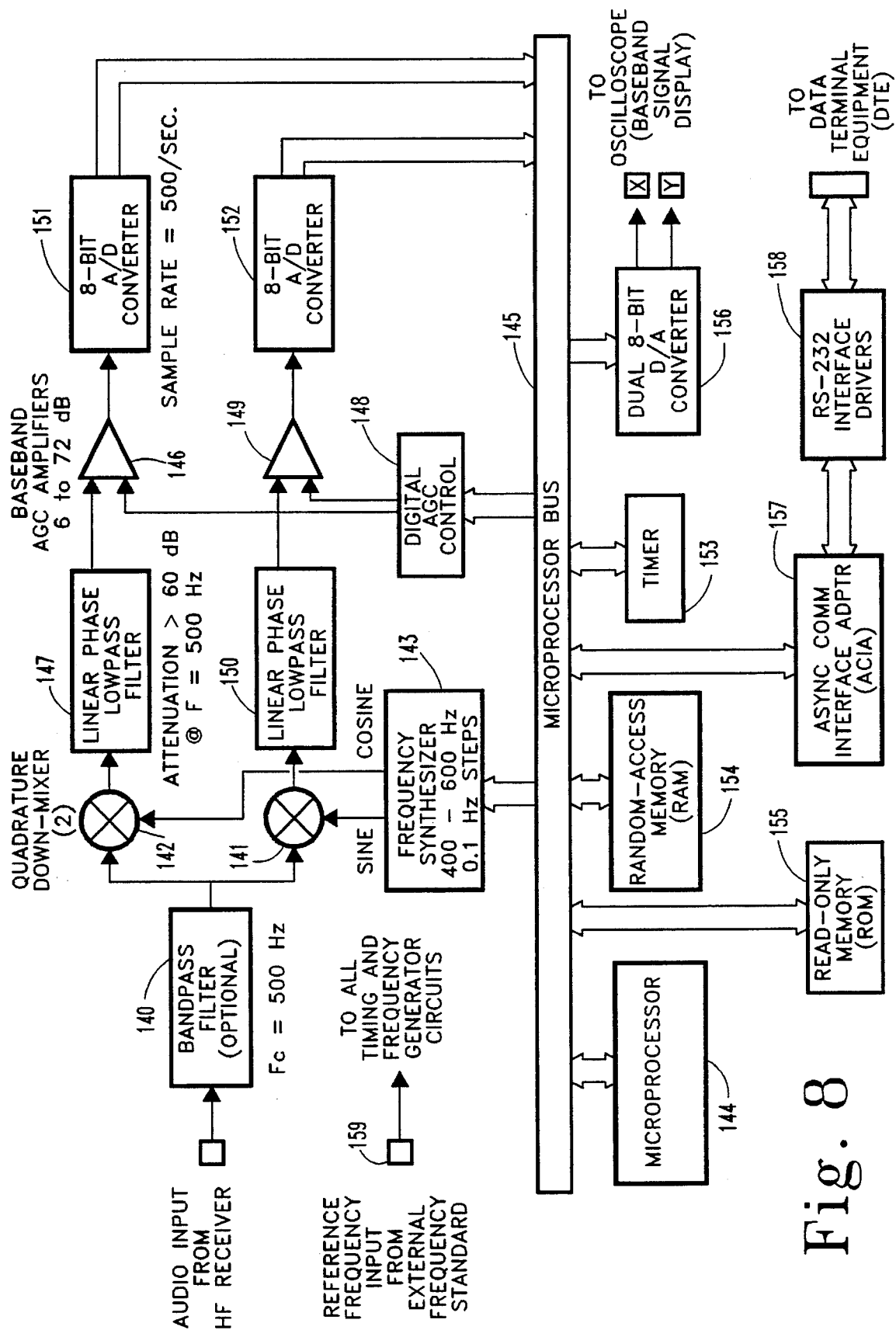
FIG. 8 is a block diagram of the tone demodulator of a 1-tone version of the invention of FIG. 1.

Referring to FIG. 8 there is shown circuitry corresponding to the tone pulse demodulator of FIG.1. Audio from the single side band receiver 19 of FIG. 1 couples through the optional bandpass filter 140 to a pair of quadrature amplitude modulated down-mixers 141 and 142 having sine and cosine frequencies corresponding to the tone frequency used by the data source system applied thereto. These frequencies are generated by a frequency synthesizer 143 whose frequency is fine tuned in 0.1 Hz steps by microprocessor 144 via the microprocessor bus 145.

The output of mixer 142 couples to one input of a baseband AGC amplifier 146 through a linear phase low pass filter 147 having an attenuation of greater than 60 dB at 50 Hz and having linear phase at a frequency of 33 Hz. A second input of AGC amplifier 146 receives a signal from a digital AGC control 148 controlled by microprocessor 144 via bus 145 for adjusting the gain of amplifier 146 from between 6 and 72 dB. Similarly, the output of mixer 141 couples to one input of a baseband AGC amplifier 149 through a low pass filter 150 comparable to filter 147. A second input of AGC amplifier 149 receives a signal from a digital AGC control 148 to similarly adjusting the gain of amplifier 149 from between 6 and 72 dB.

The outputs of the amplifiers 146 and 149 are each converted at a rate of 500 times per second to digital values by 8-bit A/D converters 151 and 152 respectively. The output of these converters couple to bus 145.

Microprocessor 144 has associated with it in conventional fashion via bus 145 a timer 153, a random access memory (RAM) 154, and a read-only memory (ROM) 155. Additionally a dual 8-bit D/A converter 156 connects to the bus 145 to generate X and Y coordinate values to provide a baseband signal display for an oscilloscope. As a final item connecting to the bus, an asynchronous communication interface adaptor (ACIA) 157 couples the demodulator's output to RS-232 interface drivers 158 which in turn connect to data terminal equipment such as the data destination equipment 21 of FIG. 1.

Because of the criticality of timing between the transmitter and the receiver in the 1-tone version, all timing circuits and frequency generator circuits require an external reference frequency standard at input 159, which may be, for example, WWV signals.

Figure 9:
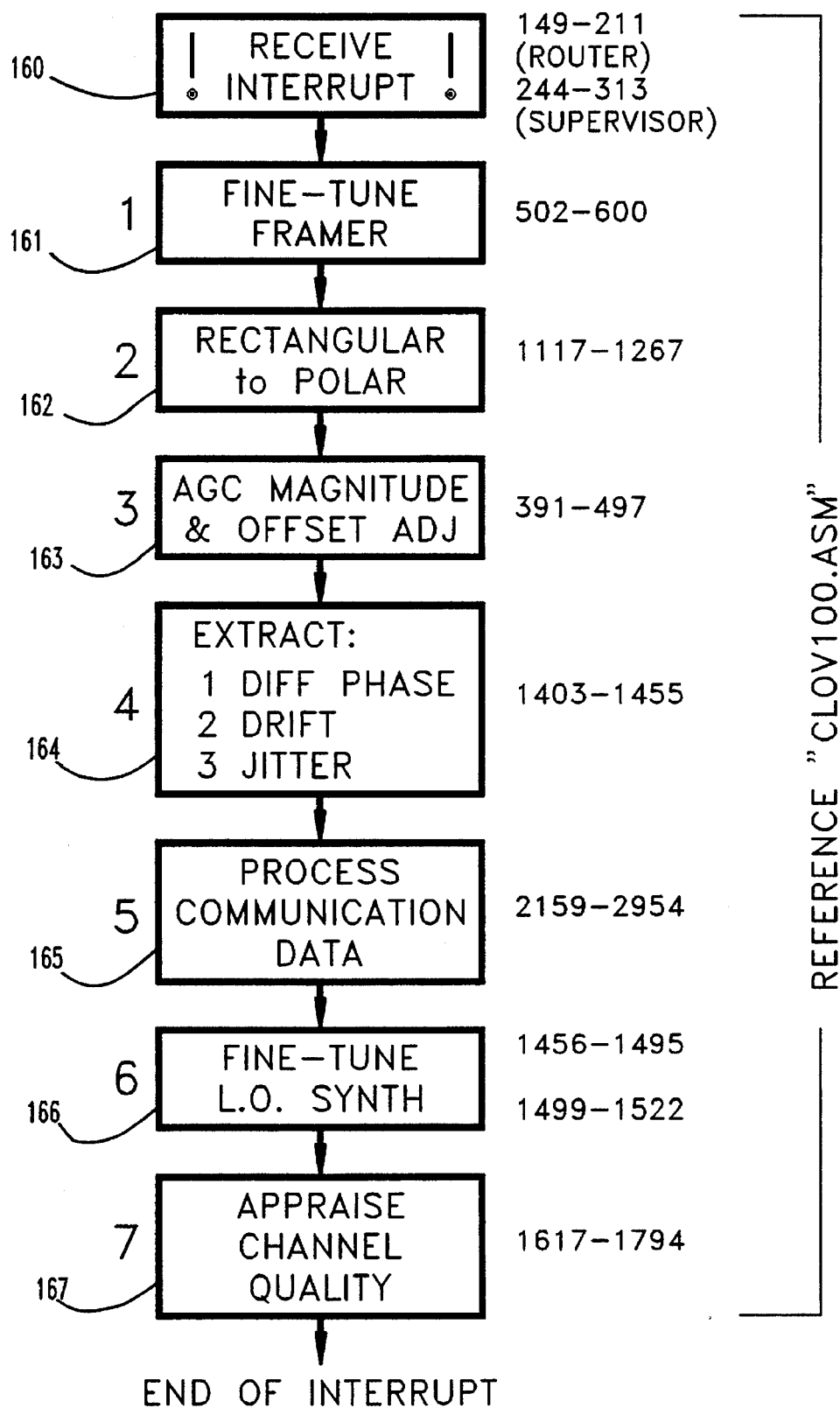
FIG. 9 is a flow chart which corresponds to the representation of FIG. 8.

The general functioning of the software is illustrated in FIG. 9, and more particularly in the Receive Controller source code (A8) which is referenced as "CLOV100.ASM". The source code accomplishes all of tile functions discussed concerning the receiver/local transmitter pair for the 1- tone version of this invention. The relevant lines of code are referenced adjacent the diagram of FIG. 9, beginning with a receive interrupt 160, followed by a fine-tune framer 161 which seeks to determine with some precision the timing of incoming tone pulses. The next steps are a rectangular to polar conversion 162, and an AGC magnitude and offset adjustment 163. The data is then extracted 164 by making use of a specially determined waveform, and determinations made of drift, jitter and phase errors. The communication data is then processed 165 (by, for example Reed-Solomon algorithms), the local oscillator is fine tuned 166 in response to detected tuning errors, the channel quality is appraised 167 to determine whether transmission values need to be changed (power, coding levels, etc.).

Turning now to the characteristics of the specially designed waveform used in the 1-tone version, the pulse shape envelope is defined by Pc[r, b, l](t) where:

r resolution in bits of the digital-to-analog converter which will be employed in the output circuits of the 1-tone version modulator (typically values from 8 to 16)

b bandwidth: the bandwidth outside of which the power spectrum of the pulses generated by said D/A converter (and reconstruction filter) never exceeds the quantization noise due to the finite resolution r l the number of sidelobes in the time domain on each side of the main pulse lobe having amplitudes large enough to be resolved by said D/A converter with resolution r where Pc[r, 1.0, $2^r$]=sinc(t), quantized to r bits.

Figure 10A:
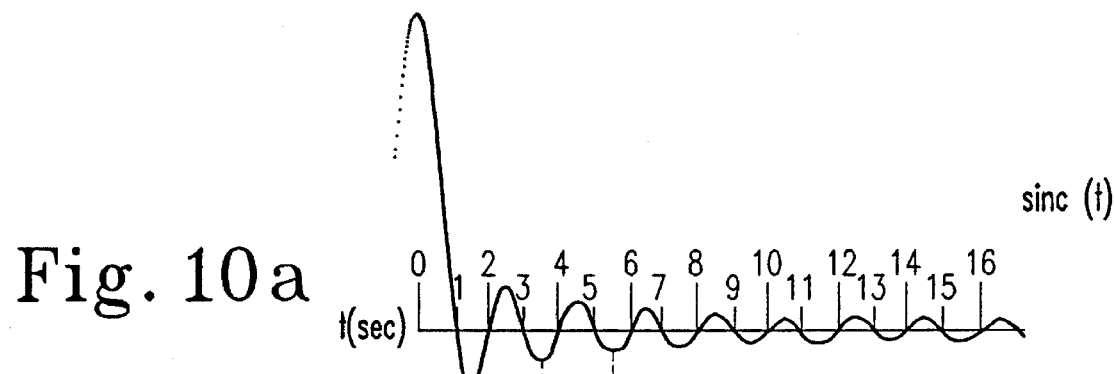
FIGS. 10a–d represent various sinc functions involved in deriving the optimum pulse envelope for the 1-tone version of the invention of FIG. 1.
Figure 10B:
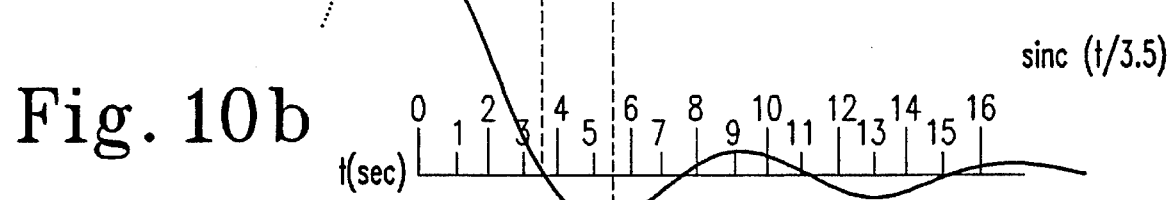
Figure 10C:
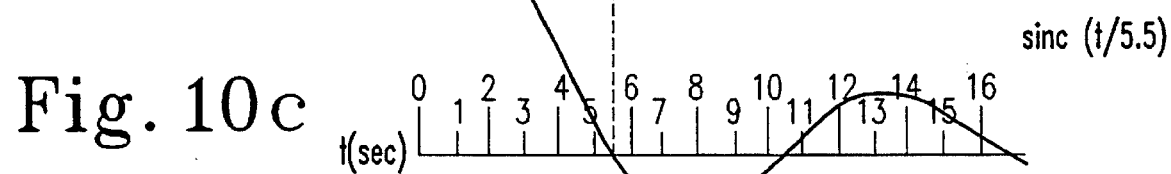

Derivation of the preferred special 1-tone version tone envelope is as follows (see also FIGS. 10–13, not drawn to scale): We begin by plotting the basic sinc(t) function FIG. 10a. Next we observing that the sinc function, sinc (t/3.5) FIG. 10b, is the basic sinc function spread out in time by a factor of 3.5 and having its first zero crossing coincident with the minor lobe peaks of the basic function sinc (t). If sinc (t) and sinc (t/3.5) are multiplied, the result is a product which has significantly reduced minor lobes. Continuing this process by a third sinc function, sinc (t/5.5) FIG. 10c, which also has its first zero crossing coincident with minor lobe peaks of the product of the first two sinc functions, even greater reduction in minor lobes is possible.

Figure 10D:
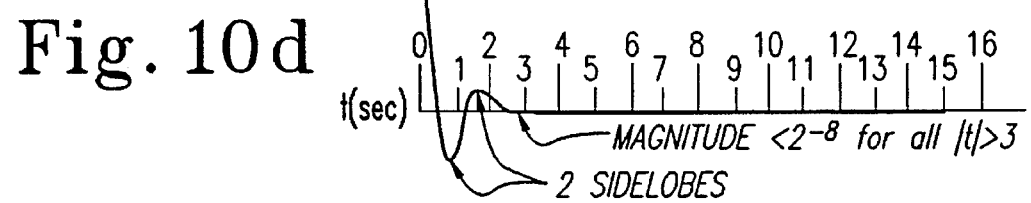
Figure 11:
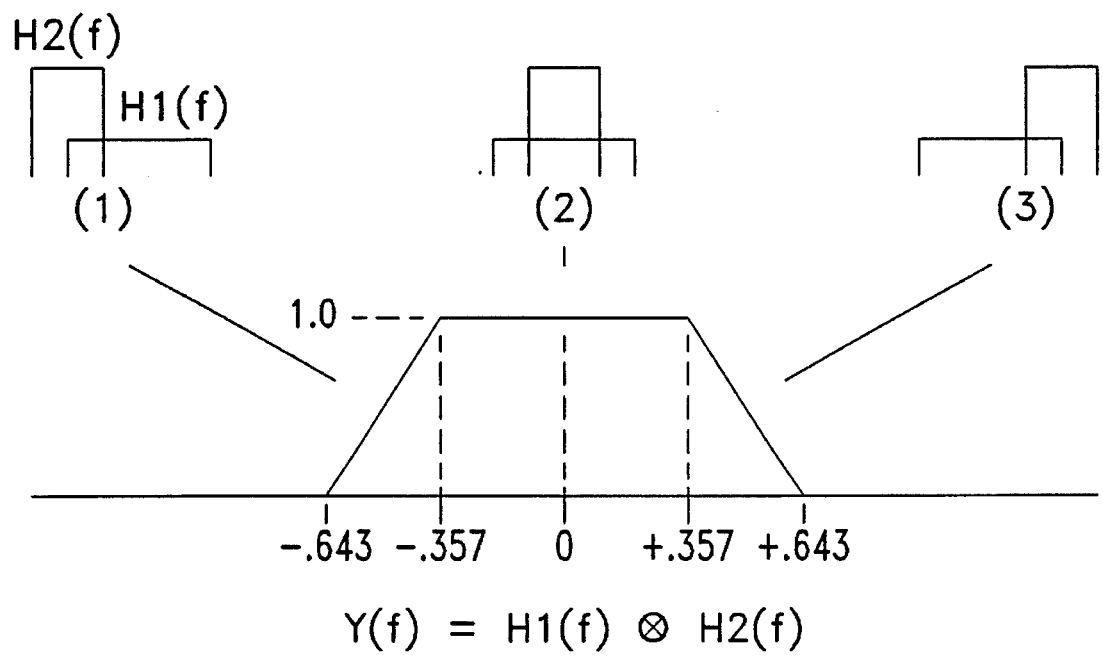
FIGS. 11 and 12 set forth an explanation for the bandwidth figure of the 1-tone version of the invention of FIG. 1 in terms of Fourier transform principles.
Figure 12:
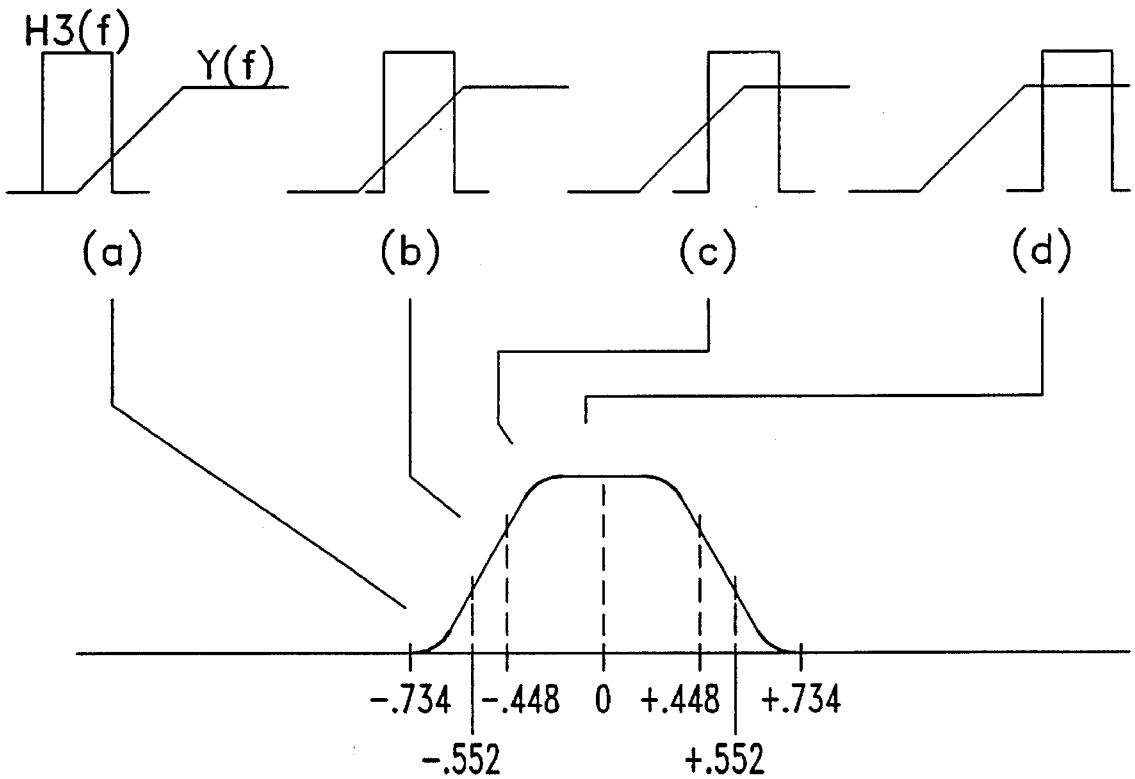

The product of these three sinc functions is shown at FIG. 10d, and is represented by the pulse function $p_c[8, 1.47, 2]$(t). FIGS. 11 and 12 set forth an explanation for the 1.47 bandwidth figure in terms of Fourier transform principles. As can be observed this technique removes all sidelobes in the frequency spectrums for resultant pulses, allowing extraordinarily high ratios of bit rate per occupied bandwidth even when adjacent channels are using comparable modulation techniques.

For eight bit systems, we have a pulse with only 2 side lobes on each side in the time domain in a side lobe free spectrum just 47% wider than the theoretical minimum. Two approximations using 16 bit D/A converters are $p_c[16, 1.92, 3](t)$=sinc (t)* sinc (t)/4.22* sinc (t)/4.64* sinc (t)/5.5* sinc (t)/6.5* sinc (t)/7.5 and $p_c[16, 1.50, 6](t)$=sinc (t)* sinc (t)/6.5* sinc (t)/7.5* sinc (t)/8.5* sinc (t)/10.5. The more side lobes in time we are willing to tolerate, the more compact the resulting spectrum will be.

Figure 13:
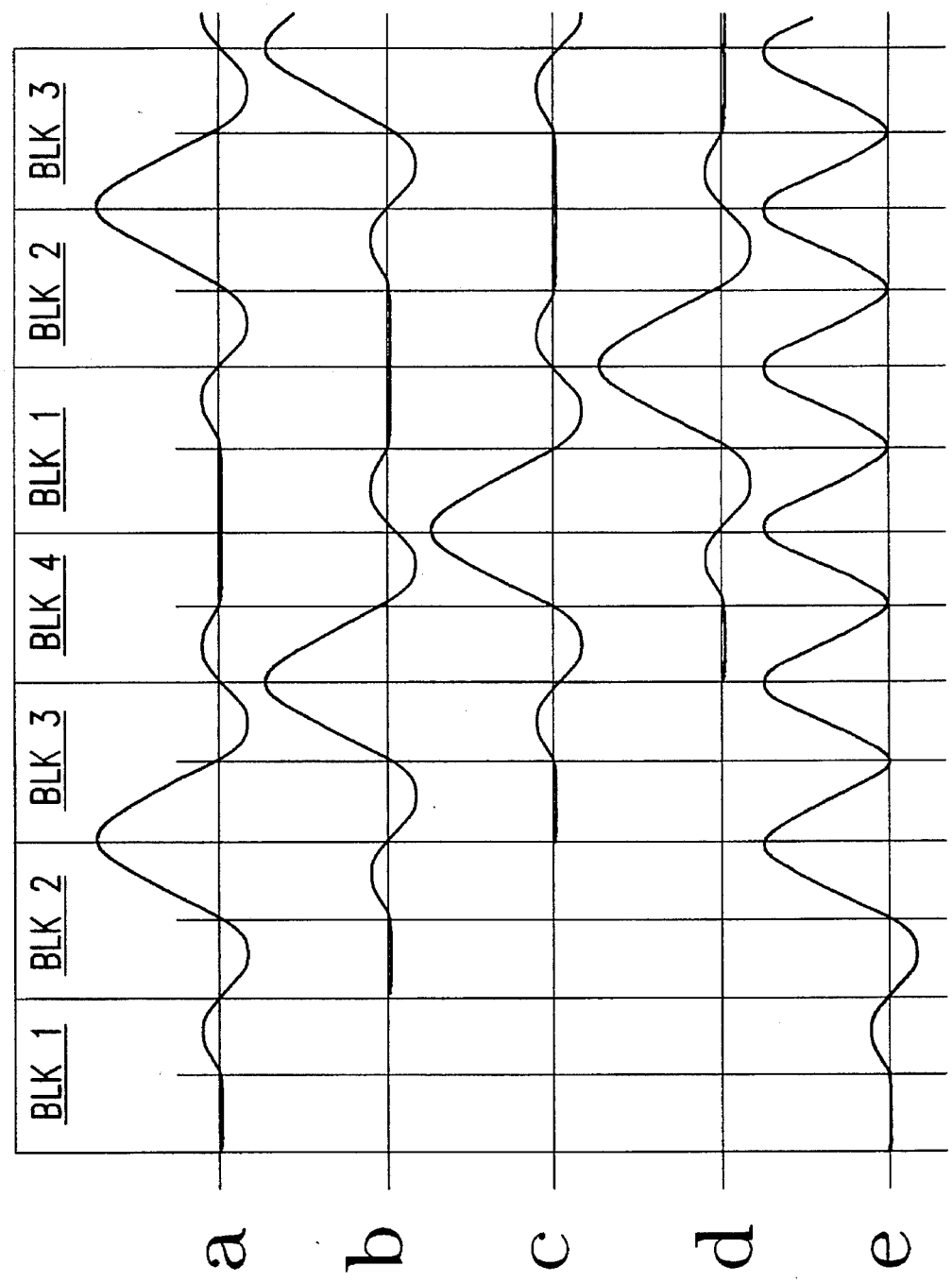

As a further compacting technique the present invention overlaps a series of tone pulses (13a–d) in time, each corresponding to the waveform of FIG. 10d, with the summation (13e) corresponding to the output of summation node 135 of FIG. 7a. The vertical scale of FIG. 13 is greatly exaggerated on the outer sidelobes for visual clarity. It should be noted that only the envelopes are shown, for simplicity of display. The actual pulses are on an audio carrier, and the negative value envelopes indicated correspond to positive value envelopes with inverted carrier phase.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. An adaptive system for adjusting operating parameters of a transmitter used for transmitting digital data which system is operable over marginal signal paths at high ratios of bit rate per occupied bandwidth comprising:

a transmitter for transmitting said digital data, said transmitter including:

adjusting means for adjusting the operating parameters of said transmitter in response to optimal operating parameter data transmitted from a receiver receiving said digital data, by selecting a data encoding format of said transmitted digital data;

a receiver for receiving said digital data separated from said transmitter by a signal path, said receiver including:

means for determining a quality of said signal path from at least two different reception parameters associated with said received digital data;

means for determining optimal operating parameters of said transmitter based upon said determination of the quality of said signal path; and means for relaying said optimal operating parameter data to said transmitter over said signal path.

2. The system of claim 1 wherein said operating parameters include code block size of a transmission of said digital data.

3. The system of claim 1 wherein said means for determining said optimal operating parameters include means for determining a number of valid phase positions used by said transmitter when encoding said digital data.

4. The system of claim 1 wherein said means for determining said optimal operating parameters include means for determining a number of valid amplitude positions used by said transmitter when encoding said digital data.

5. The system of claim 1 wherein said at least two different reception parameters are determined by means for determining signal-to-noise ratio of a transmission of said digital data and means for determining phase dispersion of said transmission of digital data.

6. The system of claim 5 wherein said means for determining includes means for comparing said signal-to-noise ratio with a corresponding phase dispersion in a lookup table implemented by software.

7. The apparatus for transmission of digital data of claim 1 wherein a frequency of a transmission of said digital data is below 30 MHz.

* * * * *